United States Patent [19]

Nielsen et al.

[11] 4,068,023

[45] Jan. 10, 1978

[54] RUBBERIZED ASPHALT PAVING COMPOSITION AND USE THEREOF

[75] Inventors: Donald L. Nielsen; James R. Bagley, both of Phoenix, Ariz.

[73] Assignee: Union Oil Company of California, Los Angeles, Calif.

[21] Appl. No.: 688,166

[22] Filed: May 20, 1976

[51] Int. Cl.² .......................... C08J 3/20; C08K 5/01; C08L 17/00; C08L 95/00
[52] U.S. Cl. .................................... 427/138; 260/2.3; 260/28.5 AS; 260/729; 260/733; 106/280; 427/204; 427/422
[58] Field of Search .............................. 106/279, 280; 260/28.5 AS, 2.3, 729, 733; 427/138, 204, 422

[56] References Cited

U.S. PATENT DOCUMENTS

| | | | |
|---|---|---|---|
| 3,779,964 | 12/1973 | Gagle et al. | 260/28.5 AS |
| 3,833,528 | 9/1974 | Behling et al. | 260/28.5 AS |
| 3,891,585 | 6/1975 | McDonald | 260/28.5 AS |
| 3,919,148 | 11/1975 | Winters et al. | 260/28.5 AS |

*Primary Examiner*—Melvyn I. Marquis
*Assistant Examiner*—H. H. Fletcher
*Attorney, Agent, or Firm*—Lannas S. Henderson; Richard C. Hartman; Dean Sandford

[57] ABSTRACT

The dissolving and/or dispersing of relatively large proportions of reclaimed rubber into molten paving asphalts is facilitated by incorporating into the asphalt a minor proportion of a highly aromatic, high-boiling, high-flash-point mineral oil. The resulting mixtures can be held at temperatures above 300° F for substantial periods of time without becoming too viscous for convenient handling, thereby facilitating the application thereof to roadways. The rubberized asphalt mixtures are particularly useful in the form of stress absorbing membrane interlayers between old, damaged pavement surfaces and an overlayer of new asphalt concrete, for providing chip-seal coatings over old pavement, as crack fillers in Portland Cement concrete or asphalt concrete pavements, and bridge deck waterproofing membranes.

11 Claims, No Drawings

RUBBERIZED ASPHALT PAVING COMPOSITION AND USE THEREOF

BACKGROUND AND SUMMARY OF INVENTION

In recent years numerous advantages have been found for incorporating various rubbers, or rubber-like polymers into paving asphalts. The added rubber can give the asphalt improved tensile strength, elasticity, and ductility, and can reduce its susceptibility to cracking and disintegration due to mechanical stress and/or extreme temperature changes. The extent to which these advantages can be realized however depends upon the proportion and type of rubber which is utilized, and the extent to which it is dissolved or uniformly dispersed in the asphalt. Until very recently, the art has contemplated the use of rubberized asphalts primarily as the cement for asphalt concretes and for this particular use economics dictated that no more than about 5 weight-percent of rubber could be used. These small proportions give some benefit, primarily in the area of improved ductility (as disclosed for example in U.S. Pat. No. 3,779,964), but give little improvement in other physical properties. It was also found difficult under practical conditions to obtain a uniform solution or dispersion of rubber in the asphalt. One known procedure was the addition of a latex emulsion, but this was found to be impractical because of the necessity of flashing the water from the asphalt mixture thus formed. In addition, asphalt viscosity is often reduced adversely by aqueous latex emulsions.

In U.S. Pat. No. 3,891,585 to McDonald, some progress was made toward achieving more of the potentially available benefits from the addition of rubber to asphalts. In this patent, relatively large proportions of ground, reclaimed rubber, ranging between 25% and 33% by weight, are utilized in the asphalt mix, and the mixture is used in the form of relatively thin layers or membranes applied over old pavements, the membranes then being dressed with mineral aggregate or rock chips. The asphalt-rubber mixture was prepared by heating the granulated rubber with the asphalt at temperatures between about 350° and 500° F, to form a "jellied" composition which provided a coating of excellent elasticity, tensile strength and durability under adverse weather conditions. However, as acknowledged by the patentee and his co-inventor Winters in their subsequent U.S. Pat. No. 3,919,148, the use of this jellied material presented one drawback; because of its viscous nature, special equipment and techniques were required for its application. It must be applied rapidly before it sets up, and the chips or aggregate must be applied to the layer of material before it sets up, in order to insure retention of the chips. All of this imposes severe time limitations upon the mixing and application of the mixture to the pavement.

To overcome the above noted difficulty, Winters et al in their U.S. Pat. No. 3,919,148, suggest adding to the jellied rubber-asphalt mixture a small proportion of a light hydrocarbon solvent such as kerosene. This is said to bring about a temporary reduction in viscosity for up to about 1 hour, during which time the mixture can be applied to the roadway and the application of rock chips completed. After rolling the chips into place it is said that "a reaction occurs between the kerosene and the asphalt-rubber composition that results in a rapid increase in viscosity and the chips are set into place so that they are not dislodged by traffic." It is conceded that if the application of chips is delayed beyond the "set," the chips will not sufficiently adhere to the asphalt to withstand vehicle traffic.

From the foregoing, it will be apparent that even with the addition of kerosene, Winters et al are still faced with a critical and troublesome timing schedule for first forming the hot asphalt-rubber "gel," adding and homogeneously mixing the kerosene with the asphalt-rubber, applying the resulting mixture to the roadway, and then applying the chips. In most cases, all of these operations must still be carried out in less than about 1 hour, which is obviously a difficult limitation to cope with in any sizeable job. It would appear therefore that the use of kerosene merely alleviates but does not solve the basic problem acknowledged by the patentees.

In addition to the foregoing, we have found that even with the use of kerosene as described by Winters et al, other problems are encountered in using the rubber-rich mixture. Firstly, the adhesive qualities of the asphalt-rubber blend are not as good as most other liquid asphalts and it is therefore generally necessary to make a light application of a liquid asphalt first, as a tack coat to the pavement being treated, to act as a "glue" to assure that the rubberized asphalt will stick. It is also generally necessary to use clean, dry, high quality rock chips to cover the hot asphalt-rubber membrane; wet or dirty chips do not adequately adhere. These factors increase the cost of any project, and at times traffic is tied up longer due to the need for a tack coat.

Moreover, the high viscosity and gel-like nature of the rubber-asphalt mixture usually means that the hot blend will not flow readily into pavement cracks when such cracks are being sealed. This means that the cracks may be sealed over by a bridging action, or it is necessary to rout out the cracks first to widen them. Sealing is then accomplished in a separate operation, which is an added inconvenience and expense. Also, in applying membranes of the mixture by conventional spraying methods, the high viscosity of the mixture makes it more difficult to obtain an even, smooth spray pattern from the asphalt distributor bar. "Roping" or "ridging" can more easily occur, which reduces the smoothness of the pavement. It can also be unsightly and the ridges can pose tire tracking problems for a vehicle.

Finally, the use of a light hydrocarbon solvent such as kerosene in itself presents additional problems. Since kerosene generally has a flash point of about 130°–150° F, a fire hazard is presented. Further, some of the lighter fractions of the kerosene are released to the atmosphere, creating an air pollution problem.

We have now discovered a novel technique by which all of the foregoing problems can be avoided or at least substantially alleviated. According to our procedure, the base asphalt stock is first modified by blending therewith at elevated temperatures a minor proportion of a heavy, high-boiling, highly aromatic, high-flash-point mineral oil solvent, thereby forming a base stock to which the rubber component, in granulated and powdered form, is then added. The resulting mixture is then heated with agitation at about 300°–450° F for about 0.5–2 hours, to obtain a homogeneous dispersion or solution of rubber in the base stock. Under normal conditions the resulting mixture presents no fire hazard or atmospheric pollution problems, and at temperatures above about 325° F retains a fluid, easily spreadable consistency for periods of at least about 12 hours or more in most cases. The resulting mixture can be spread over a roadway using standard equipment and spraying techniques to form a highly adherent membrane over the roadway, which generally requires no tack coat. Due to its relatively non-viscous consistency when applied to the roadway, cracks are filled and sealed rather than bridged over. No difficulty is encountered in obtaining an even, smooth spray pattern from the asphalt distributor bar, to lay down smooth membranes ranging in thickness between about 1/16 -inch and ¼ inch.

In addition to the foregoing, it has been found that the added high-boiling solvent substantially increases the life, as well as the cold temperature characteristics and durability of pavement constructions made from the resulting asphalt-rubber compositions.

It was found however that when the ground rubber stock employed was composed exclusively of devulcanized and/or synthetic rubber, the cooled membranes were somewhat lacking in toughness and resiliency. But it was found further that this deficiency could be remedied by including in the rubber stock employed a substantial proportion of vulcanized, ground reclaimed natural rubber. Road testing conducted to date indicates that such suitably compounded and applied membranes retain their toughness and resiliency over extended periods of time, in a manner similar to the membranes described in the McDonald and Winters et al patents.

DETAILED DESCRIPTION

Asphalts which may be utilized herein include any of the well known bituminous materials used heretofore in the paving art such as natural asphalts or those derived from petroleum refining, for example by vacuum distillation, solvent refining, steam refining with or without air blowing, and the like. Paving grade asphalts are variously characterized throughout the Unites States, but for purposes of this invention the asphalt specifications adopted January 1, 1974 by the Pacific Coast Division of the Asphalt Institute will be utilized. According to thse specifications, five basic grades of paving asphalts are designated, and characterized principally on the basis of viscosity of their "aged residue" (AR), i.e., their viscosity after a standard aging procedure designed to correlate with the hardening which occurs during pug-mill mixing of asphalt and aggregate. The specifications for these asphalts are as follows:

Any of the foregoing asphalts may be utilized herein, as well as others having suitable characteristics for use in paving mixtures. Other suitable paving asphalts are penetration grade asphalts per A.S.T.M. specification D 946-69a and AASHTO designation M-226 and similar specifications issued separately by several states. Slow curing (sc) liquid asphalts or road oils produced either by reducing petroleum crude oil directly to grade by distillation, or by fluxing a paving asphalt with a light oil are also suitable for such asphalt-rubber blends.

Those skilled in the art will readily understand that the selection of a suitable grade of asphalt depends primarily upon climatic conditions to which the paving will be subjected, softer grades being used in cold climates and harder grades for warmer climates. Also, for use at high elevations, above about 4500 feet, softer grades, conforming approximately to the AR-1000 or AR-2000 specifications, are preferred.

The rubber component employed herein may be either natural reclaimed rubber or synthetic reclaimed rubber. The synthetic rubbers are preferably polymers of open-chain conjugated dienes having from 4 to 8 carbon atoms per molecule, for example 1,3-butadiene, 2,3-dimethyl-1,3-butadiene, and the like. Examples of such polymers are polybutadiene, polyisoprene, polychloroprene, butadiene-styrene copolymers and the like. Copolymers of mixtures of such conjugated dienes can also be used, as well as copolymers of monomer systems having a major amount of conjugated diene with a minor amount of copolymerizable monomer containing a vinylidene group.

As previously indicated, it is much preferred to utilize a mixture comprising ground reclaimed, vulcanized natural rubber, and ground devulcanized natural and/or synthetic reclaimed rubber. The devulcanized reclaimed rubber component contributes to improved ductility, while the vulcanized reclaimed natural rubber (or partially devulcanized reclaimed natural rubber) contributes greatly to adhesion, toughness and resiliency. Vulcanized synthetic rubbers vary considerably in their rheological properties and solubilities in asphalt, but they generally contribute somewhat to toughness and resiliency. To obtain optimum combinations of their desirable physical characteristics, the relative proportions of the basic types of ground rubbers should fall within the following ranges:

TABLE 1

UNIFORM PACIFIC COAST ASPHALT SPECIFICATIONS
PAVING ASPHALT VISCOSITY GRADED AT 140 DEG. F (60C) ON RTFC RESIDUE

| Specification Designation | Viscosity Grade | | | | |
|---|---|---|---|---|---|
| | AR-1000 | AR-2000 | AR-4000 | AR-8000 | AR-16000 |
| Test on Residue from RTFC Procedure-Calif.Method 346E | | | | | |
| Absolute Viscosity at 140° F (60° C) poise | 750–1,250 | 1,500–2,500 | 3,000–5,000 | 6,000–10,000 | 12,000–20,000 |
| Kinematic Viscosity at 275° F (135° C) cs, min. | 140 | 200 | 275 | 400 | 550 |
| Penetration at 77° F, (25° C) 100 g/5 sec., min. | 65 | 40 | 25 | 20 | 20 |
| Percent of original penetration at 77° F (25° C), min. | — | 40 | 45 | 50 | 52 |
| Ductility at 77° F, (25° C) cm, min. | 100 | 100 | 75 | 75 | 75 |
| TEST ON ORIGINAL ASPHALT | | | | | |
| Flash point, Pensky-Martens, ° F. min. | 400 | 425 | 440 | 450 | 460 |
| Solubility in Trichlorethylene percent, min. | 99 | 99 | 99 | 99 | 99 |

TABLE 2

| | Weight Percent | |
|---|---|---|
| | Broad Range | Preferred Range |
| Devulcanized Reclaimed | | |

TABLE 2-continued

|  | Weight Percent | |
| --- | --- | --- |
|  | Broad Range | Preferred Range |
| Natural or Synthetic Rubber Vulcanized Scrap | 15 – 70 | 20 – 50 |
| Natural Rubber Vulcanized Scrap | 10 – 60 | 25 – 45 |
| Synthetic Rubber | 0 – 50 | 20 – 40 |

Since the vulcanized rubber components are more difficult to blend in the solvent-asphalt mixture, it is preferred that they be ground to pass at least 95% thereof through a No. 30 sieve (AASTO designation M 92 sieve size). The devulcanized rubber component can be considerably more coarsely ground, such that 100% thereof will pass the No. 10 sieve.

The mineral oil solvents employed herein are heavy aromatic fractions of petroleum, coal tar, tar sand oils, shale oils and the like, boiling generally in the range of about 700°–1100° F, and having a gravity ranging between about 3° and 12° API. The aromatic content of these oils generally ranges between about 50 and 100 percent, preferably between about 60 percent and 95 percent by weight (clay-gel method). The content of saturated hydrocarbons should be less than about 20 weight percent, preferably less than 12 weight percent. Polar compounds, such as heterocyclic nitrogen and sulfur compounds, may range between about 5 and 25 weight percent. The flash point, c.o.c. of the oil should be above about 300° F, preferably above 350° F. Oils of this character are generally derived from the solvent extraction of distillate or residual lubricating oil stocks, using solvents such as phenols, cresols, furfural and the like. They may or may not contain asphaltenes, depending upon whether a distillate or residual feedstock is extracted. Heavy recycle oils derived from catalytic cracking operations, sometimes called "slurry" oils, can also be utilized.

Examples of suitable solvent oils are those marketed by Shell Chemical Company under the trade name "Dutrex," those marketed by Sun Oil Company under the trade name "Sundex," and those marketed by Witco Chemical Company under the trade names "Petroflux" and "Califlux." Particularly suitable oils are the following:

TABLE 3

|  | Dutrex 419 | Dutrex 739 | Dutrex 916 | Dutrex 957 |
| --- | --- | --- | --- | --- |
| Gravity, ° API | 8.8 | 5.6 | 9.4 | 5.6 |
| Flash Point, ° F | 365 | 425 | 430 | 510 |
| Distillation, ° F |  |  |  |  |
| IBP | 622 | 740 | 700 | 775 |
| 50% | 736 | 818 | 917 | 930 |
| 90% | 840 | 884 | Crk. | Crk. |
| Viscosity-Gravity Constant | 0.986 | 1.004 | — | 0.980 |
| Molecular Analysis (Clay-Gel, W%) |  |  |  |  |
| Asphaltenes | 0 | 0 | 3.9 | 0 |
| Polar Compounds | 15.4 | 18.0 | 22.1 | 26.8 |
| Aromatics | 76.0 | 76.0 | 57.6 | 66.2 |
| Saturates | 8.6 | 6.0 | 16.4 | 7.0 |

The technique employed for compounding the three components is not particularly critical, the general requirements being to provide suitable means for agitating and heating the mixture at temperatures between about 300° and 500° F, preferably about 350°–450° F. Agitation may be provided by suitable mechanical means such as propellors, paddles, high-speed augers or the like, or by air injection through the body of liquid. All three components may be simultaneously admixed and brought up to the desired temperature, but a much preferred procedure is to first blend the solvent oil with the asphalt and bring the homogeneous mixture up to the desired blending temperature, and then mix in the ground, reclaimed rubber component. Preferably, the ground natural reclaimed rubber component is added first, and after thorough mixing the devulcanized rubber is added. The time required to achieve homogeneity following addition of the natural rubber component generally ranges between about 0.5 and 2 hours, assuming that there is good agitation. Suitable proportions of the three components in the final mixture fall within the following ranges:

TABLE 4

|  | Weight-Percent | |
| --- | --- | --- |
|  | Broad Range | Preferred Range |
| Asphalt | 50–89 | 65–86 |
| Rubber (Total) | 10–30 | 12–20 |
| Solvent Oil | 1–20 | 2–15 |

The selection of specific optimum proportions of the three components will depend upon several interrelated considerations. Firstly, for use in conjunction with the relatively soft grades of asphalt, in the AR-1000 to AR-4000 range, proportions of solvent oil in the lower ranges will be utilized, while higher proportions will be utilized in conjunction with the harder grades of asphalt. Also, it will generally be desirable to utilize relatively large proportions of solvent oil when the overall rubber content of the composition is in the high range of e.g., 20–30 percent, especially when a large proportion of the total rubber is ground, vulcanized natural rubber. For use in chip seal overlays, where adhesiveness is an important consideration, rubber proportions of about 20 percent should generally be used. If the final composition is to be utilized as a stress absorbing membrane interlayer or stress relieving interface, where the primary consideration is toughness and elasticity, preferred rubber proportions should range between about 15–30 weight-percent. By judicious experimentation under these precepts, those skilled in the art will have little difficulty in arriving at an optimum proportion of the three components for any specific use.

Several important uses for the compositions of this invention have been developed. On old roadways which have not been too badly damaged by weathering and/or stress cracking, a chip seal membrane overlayer is very effective. For this application the pavement is first thoroughly broomed, and the hot asphalt-rubber mixture is then applied in conventional manner from a tank spray truck. Generally from about 0.5–1 gallon per square yard is sprayed on the pavement to provide a membrane ranging in thickness between about 1/16-inch and 3/16-inch. The application is carried out at about 325°–450° F, usually about 375°–425° F. After spreading, rock chips are applied to the surface in conventional manner, and immediately rolled into the membrane. Such chip seal membranes provide an effective water-proof sealant with good resiliency and wearing qualities.

Another important use, generally involving more heavily damaged roadways, lies in the area of stress absorbing membrane interlayers or stress relieving interface applied ahead of a conventional asphalt concrete overlay. For this purpose, the rubber-asphalt membrane is applied substantially as described above, and then given a light coating of rock chips or sand to enable temporary traffic and construction equipment to run on the membrane without damage. Then the hot asphalt concrete mixture is applied in conventional manner in varying thickness. The membrane interlayer seals the concrete overlay from ground moisture and retards the appearance of reflection cracking in the overlay from the cracks in the old pavement. Due to its elasticity, the interlayer membrane also substantially retards the appearance of new stress cracking in the overlay. Membrane interlayers of this type are particularly desirable in cases where the asphalt concrete overlayer is limited in thickness to about 0.5–4 inches, for it is in thin constructions of this type that reflection cracking from the old pavement is most troublesome.

Chip-seal membrane overlayers of the type described above are also very useful as bridge deck coatings, due primarily to their durable, water sealing characteristics. In cold climated de-icing chemicals are often applied to the bridge decks, and such chemicals are highly corrosive to the metallic substructure of the bridge. By providing a durable water-proof seal, corrosion is greatly reduced. Also, such asphalt-rubber membranes are capable of reducing or eliminating surface cracking caused by bridge deck movement.

Stress absorbing membrane underlayers are useful in the case of new roadway construction. These underlayers are applied directly to the graded roadway in a manner similar to that of membrane interlayers. The principal utility in this case lies in providing a waterproof seal against ground moisture and it keeps surface moisture from penetrating into and softening the roadway base. In the case of relatively thin asphalt concrete constructions, stress and reflective cracking is also retarded.

In addition to the foregoing, the compositions of this invention can also be utilized in conventional manner as crack fillers in Portland Cement concrete or asphalt concrete pavement. In this particular case, the qualities of resiliency, ductility and adhesiveness are particularly beneficial in providing durable patching and sealing.

The following examples are cited to illustrate the invention, but are not to be construed as limiting in scope. The rubber and solvent components utilized in these examples are identified as follows:

"Dutrex 739" — a distillate lubricating oil furfural extract, further characterized in Table 3 above.

"Flo-Mix" — a screen size No. 10–30 ground devulcanized reclaimed rubber (mostly synthetic) obtained from U.S. Rubber Reclaiming Company, Vicksburg, Mississippi.

"G-248" — a screen size minus No. 30 mesh ground rubber scrap containing 53.7% natural vulcanized rubber, most of the remainder being vulcanized synthetic rubber. This was also obtained from U.S. Rubber Reclaiming Company.

EXAMPLE 1

A base asphalt stock was prepared by blending 87 parts by weight of an AR-8000 grade asphalt with 13 parts by weight of Dutrex 739, and the mixture was brought to a temperature of about 350° F. About 20 parts by weight of Flo-Mix rubber was then blended into the base stock and the mixture was agitated for about 1 hour to provide a homogeneous blend. The mixture was held at about 350° F for 2-3 hours in the mixing tank before being pumped through approximately 65 feet of pipeline to an adjacent pug-mill where it was blended with mineral aggregate to provide a hot mix asphalt concrete. The hot-mix was loaded on trucks and transported to an experimental paving job where it was utilized to pave a one-half mile stretch of highway in Phoenix, Arizona. No difficulty was encountered in handling and pumping the rubberized asphalt mixture during this operation, whereas a similar mixture prepared in accordance with the Winters et al patent, utilizing a kerosene solvent, became so viscous that it could not be pumped through the pipeline leading to the pugmill.

EXAMPLE 2

About 68 tons of a rubberized asphalt composition of this invention was prepared and applied as a chip-seal coating on approximately two miles of Highway 68 near Kingman, Arizona. The rubberized asphalt was prepared in a portable production tank by blending 85 parts by weight of AR-8000 grade asphalt with 15 parts by weight of Dutrex 739 at 375° F, and then blending in 12 parts by weight of G-248 and 10 parts by weight of Flo-Mix. The mixture was agitated at 390° F for about 2 hours until homogeneous, and then loaded on conventional asphalt distributor trucks for application. Because of delays in the project, approximately 3000 gallons of the rubberized asphalt blend was held overnight in a distributor truck. By the next morning, the temperature of the blend had dropped to approximately 250° F. This portion was then reheated in the truck and sprayed on the pavement at 375° F with no particular difficulty. The application rate was 0.6 gallons per square yard. This test proved conclusively that the rubber asphalt compositions of this invention present no gelling problems for at least about 12 hours. The coating on this particular job was covered with mineral chips and rolled in conventional manner and has survived one winter of use without apparent damage.

EXAMPLE 3

About 46 tons of our rubberized asphalt blend was applied as a stress absorbing membrane interlayer over a damaged stretch of State Highway 180 near Flagstaff, Arizona. In this instance the blend was composed of 90 weight parts of AR-8000 grade asphalt, 10 weight parts of Dutrex 739, 12 weight parts G-248 and 10 parts of Flo-Mix, and was prepared substantially in the manner described in Example 2. The blend was loaded into tank trucks, transported to the job site and sprayed onto the pavement at about 400° F, at a rate of 0.65 to 0.7 gallons per square yard. In this project a delay was again encountered and it was once again proven that the blend could be held for over 1 hour and sprayed without difficulty. The membrane was then coated with volcanic cinder chips and rolled in conventional fashion to enable construction equipment to run on the membrane without damage.

Subsequently, the above chip membrane of this invention was overlaid with about 1.5 inches of regular asphalt concrete. It was intended that an additional 1-inch layer be added later, but despite the fact that this additional layer was not placed, this section of roadway is still in excellent condition after one winter of Flagstaff weather, which entails snow and some below zero degree temperatures.

EXAMPLE 4

A different mixture was prepared by blending 97 parts by weight of AR-2000 grade asphalt, 3 weight parts of Dutrex 739, 17 weight parts of G-248 and 6 weight parts of Flow-Mix. The blend was prepared in a distributor truck substantially as described in Example 2. A portion of the mixture was then applied at 400° F and at a rate of 0.55–0.6 gallons per square yard, over a one block stretch of Highway 66 in the city of Flagstaff, Arizona. Mineral chips were then applied in conventional fashion.

To the remainder of the asphalt-rubber blend in the distributor truck was added an additional 10 gallons of Dutrex 739, which brought its total content to about 4.5 weight percent of the composition. This altered blend was then applied at 0.58 gallons per square yard at 400° F to a badly damaged section of rural highway located outside the city of Flagstaff, Arizona. Both of these applications provided an effective seal coat and continued to do so after one winter of Flagstaff weather.

No liquid asphalt tack coat was used in either of the above applications.

EXAMPLE 5

Another chip seal membrane application of this invention was tested in the city of Phoenix, Arizona on Buckeye Road west of 35th Avenue. This section of the roadway carries very heavy Interstate Highway 10 traffic and was fairly badly ravelled from a previous chip seal done with the McDonald-Winters patented system. For this test we prepared about 4 tons of a blend comprising 94.5 weight parts of AR-4000 asphalt, 5.5 weight parts of Dutrex 739, 15 weight parts of G-248 and 7 weight parts of Flo-Mix. Mixing was accomplished with air agitation in a distributor truck under conditions essentially as described in Example 2. The mixture was applied at 400° F, and 0.6–0.65 gallons per square yard over the raw pavement, i.e., there was no tack coat. The membrane was then covered with aggregate chips that were the sweepings from previous seal coat work, and hence were very dirty. Ordinarily, such chips would not adhere well to asphalt or asphalt-rubber membranes, but it was found that our membrane held them very well, and was also strongly adherent to the old pavement, despite the lack of a tack coat.

EXAMPLE 6

About 6.8 tons of another asphalt rubber blend of this invention was applied to a heavily travelled, badly cracked pavement on Dysart Road, Maricopa County, near Phoenix, Arizona. The application was made without a tack coat at about 425° F, and at a rate of about 0.5–0.65 gallons per square yard. The rock chips applied thereto were clean and of good quality, but through error had been drenched with water and were very wet. Normally, such chips will not stick to hot asphalt, and it was concluded that the traffic would immediately whip off most of the chips, but surprisingly a large percentage of them stuck, and there was good adherency of the membrane to the underlying pavement surface. The blend used in this test was composed of 94 weight parts of AR-4000 asphalt, 6 weight parts of Dutrex 739, 8 weight parts of G-248, 7 weight parts of Flo-Mix and 8 weight parts of a vulcanized scrap rubber casings made principally from truck tires and containing an average of 31.8 weight-percent natural rubber. Blending of the components and the application technique was substantially as described in Example 2.

The following claims and their obvious equivalents are intended to define the true scope of the invention:

We claim:

1. A paving composition comprising a heat-blended, substantially homogeneous composite of (1) from about 50–89 weight-percent of an asphaltic component selected from the class consisting of paving grade asphalts, slow curing liquid asphalts and road oils, (2) between about 10% and 30% by weight of a reclaimed rubber component, about 10–60 weight-percent of said reclaimed rubber component being ground vulcanized natural rubber, and about 15–70 weight-percent thereof being ground devulcanized rubber, and (3) between about 1% and 20% by weight of a mineral oil solvent having a flash point above about 300° F, and containing more than about 50 weight-percent aromatics, at least about 50% of said solvent boiling above 700° F, and at least about 90% thereof boiling above 600° F.

2. A composition as defined in claim 1 wherein said mineral oil solvent contains at least about 60 weight-percent aromatics.

3. A composition as defined in claim 1 wherein said mineral oil solvent has a flash point above about 350° F.

4. A composition as defined in claim 1 wherein said mineral oil solvent contains at least about 60 weight-percent aromatics and less than about 20 weight-percent saturated hydrocarbons.

5. A composition as defined in claim 4 wherein said mineral oil solvent has a flash point above about 350° F.

6. A method for the manufacture of a paving composition which comprises:
  1. blending about 50–89 weight-percent, based on the final composition, of an asphaltic component selected from the class consisting of molten paving grade asphalts, slow curing liquid asphalts and road oils, with about 1–20 weight-percent of a mineral oil solvent having a flash point above about 350° F, and containing more than about 50 weight-percent aromatics, at least about 50% of said solvent boiling above 700° F, and at least about 90% thereof boiling above 600° F;
  2. adding to the blend from step (1) about 10–30% by weight, based on the final composition, of a granulated reclaimed rubber component, about 10–60 weight-percent of said reclaimed rubber component being vulcanized natural rubber, and about 15–70 weight-percent thereof being devulcanized rubber; and
  3. heating and agitating the resulting mixture at a temperature between about 300° and 500° F for a time sufficient to produce a substantially homogeneous composite.

7. A method as defined in claim 6 wherein said heating in step (3) is carried out at about 350°–450° F.

8. A method as defined in claim 6 wherein said mineral oil solvent contains at least about 60 weight-percent aromatics and less than about 20 weight-percent saturated hydrocarbons.

9. A method for applying a rubberized asphalt membrane to a roadway which comprises preparing a paving composition by the method of claim 6, and thereafter spraying the resulting composition onto the untreated prepared roadway at a temperature between about 325° and 450° F, to provide an adherent membrane of about 1/16 – 3/16 inch in thickness.

10. A method as defined in claim 9 wherein said spraying is carried out at least about 2 hours after the formation of said substantially homogeneous composite.

11. A method as defined in claim 9 wherein rock chips or other mineral cover materials are subsequently applied to the surface of said membrane.

* * * * *